COLLIER & SAMPSON.
Pendulum Scales.
No. 5,825.
Patented Oct. 3, 1848.
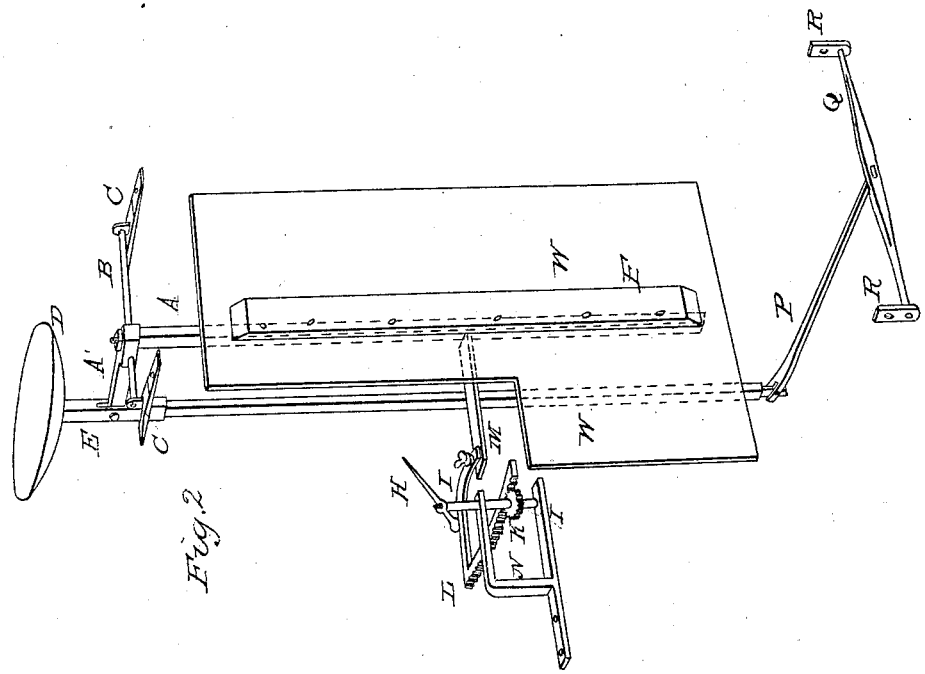
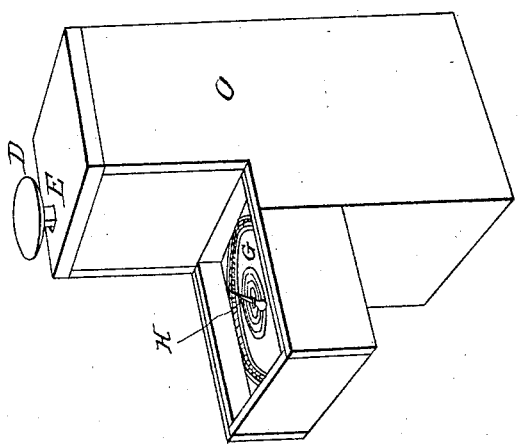

UNITED STATES PATENT OFFICE.

E. SAMPSON AND C. S. COLLIER, OF WEATHERSFIELD, VERMONT.

SCALE FOR WEIGHING.

Specification of Letters Patent No. 5,825, dated October 3, 1848.

*To all whom it may concern:*

Be it known that we, ELNATHAN SAMPSON and CHARLES S. COLLIER, of Weathersfield, in the county of Windsor and State of Vermont, have invented a new and useful Scale for Weighing; which is described as follows, reference being had to the annexed drawings of the same, making part of this specification.

Figure 1, is a perspective view of the portable counter, or box containing the scales or weighing apparatus, showing the dish, graduated plate and index. Fig. 2, is a perspective view of the weighing apparatus, detached from the counter.

Similar letters in the figures refer to corresponding parts.

This apparatus for weighing, consists of a lever A, A' bent at right angles or otherwise shaped, made to vibrate on a horizontal angle B, passed through it, near the angle, and turning in boxes C C, fastened to the counter—the dish D containing the article to be weighed, being attached to the short arm of the lever, by a vertical rod E, and the weight F, for retaining the short arm of the lever in a horizontal position when not weighing is secured to the long arm of the lever.

The weight of the article placed in the dish, is indicated on a fixed horizontal graduated plate G, by means of a pointer or index H, attached to a vertical axle I, passed through the center of a pinion K, moved by a vibrating segment rack L, attached to a horizontal arm M, inserted into the long or swinging arm of the vibrating lever A, to which the weight F, and wings W, are attached.

The frame N, containing the boxes of the axle I, of the pinion K, is fastened to the counter or box O in some convenient position.

The dish or scale D, is retained in a horizontal position, by means of a vertical rod E, attached to the outer extremity of the short arm A', of the lever A A', extended down below the level of the bottom of the weight F, where it is attached to a vibrating guide rod P, placed parallel to the lever A', inserted into a rock shaft Q, turning in boxes R R, fastened to the counter or box O, which may be made of any convenient size, form, and material, portable or fixed or otherwise constructed.

The weight F is provided with wings W which by the resistance the atmosphere offers to their motion retard the oscillation and thus more readily restore the equilibrium of the weighing apparatus, when an article to be weighed is thrown suddenly into the dish.

The graduated plate, for indicating the several weights of which the apparatus or scales is capable of weighing, is marked in the usual manner by placing known standard weights, successively into the dish, and marking on the plate opposite the pointer, or index, the number indicating the several weights in pounds, and fractions of pounds, or in any manner desired.

The operation of the apparatus is very simple. The article to be weighed being placed in the dish D, will of course cause it to descend, and the lever, to which it is attached, to turn on its axis B, the vertical arm A, of the lever, deviating from a vertical line a number of degrees, according to the number of pounds placed in the dish, the lever A, carrying with it the arm M, and rack L, causing the pinion K, and pointer H, to turn simultaneously, the latter indicating on the graduated plate, the number of pounds, and fractions of pounds, placed in the dish.

The lever A A', may be curved instead of forming a right angle, or it may be made and arranged in any convenient way or manner in the form of the letter S or otherwise, with the angle above the center, forming a long and short arm—the wing W and weight being appended to the former, and the receptacle for the article to be weighed, to the latter.

What we claim as our invention, and which we desire to secure by Letters Patent is—

The combination of the wings W W with the weighted lever A A' arranged and operating in the manner and for the purpose herein set forth.

ELNATHAN SAMPSON.
CHARLES S. COLLIER.

Witnesses:
A. GAY,
WILLIAM GAY.